3,600,475
PROCESS FOR PREPARING 2-CHLOROETHANE-PHOSPHONIC ACID ESTERS

Kurt Schimmelschmidt, Frankfurt am Main, and Hans-Jerg Kleiner, Bad Soden, Taunus, Germany, assignors to Farbwerke Hoechst Aktiengesellschaft vormals Meister Lucius & Brüning, Frankfurt am Main, Germany
No Drawing. Filed Mar. 7, 1968, Ser. No. 711,181
Claims priority, application Germany, Mar. 9, 1967, F 51,763
Int. Cl. C07f 9/40
U.S. Cl. 260—970     3 Claims

ABSTRACT OF THE DISCLOSURE

Process for preparing 2-chloroethane-phosphonic acid esters by reacting vinyl chloride at about normal pressure with diethyl phosphites or diethyl thiophosphites in the presence of radicals generating substances and/or ultraviolet radiation at a temperature between about 120° and 200° C. and under inert atmosphere and in absence of oxygen.

---

It is known that halogenoalkane-phosphonic acid esters can be prepared by reacting halogenoethylenes with dialkyl phosphites in the presence of free radical-forming catalysts. By the addition of tetrafluoroethylene to a telomerisation mixture there were obtained, for example, different long-chained polyfluoroalkane-phosphonic acid esters (U.S. Pat. No. 2,559,754). But the addition of gaseous tetrafluoroethylene is only possible under pressure in the autoclave.

Now it has been found that 2-chloro-ethanephosphoric acid esters of the general Formula I

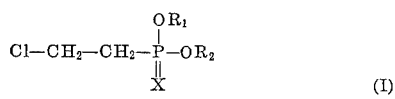

$$\text{Cl-CH}_2\text{-CH}_2\text{-}\underset{\underset{X}{\parallel}}{\overset{\overset{OR_1}{|}}{P}}\text{-OR}_2 \quad (I)$$

wherein X represents an oxygen atom or a sulfur atom, $R_1$ and $R_2$ represent alkyl groups with 1 to 12 carbon atoms, preferably with 1 to 8 carbon atoms, can be prepared by reacting vinyl chloride with dialkyl phosphites of the general Formula II

$$\text{H-}\underset{\underset{X}{\parallel}}{\overset{\overset{OR_1}{|}}{P}}\text{-OR}_2 \quad (II)$$

wherein X, $R_1$ and $R_2$ have the meaning given above, in the presence of radical formers and/or UV-light at a temperature of about 120 to about 200° C., preferably of about 150 to about 180° C., without using pressure.

Appropriate phosphites are for example dimethyl phosphite, diethyl phosphite, di-isopropyl phosphite, di-(n-butyl)-phosphite, di-(2-ethylbutyl)-phosphite, di-(n-hexyl)-phosphite, di-(2-ethylhexyl)-phosphite, di-(n-octyl)-phosphite, diethyl-thiophosphite and di-isopropyl thiophosphite. The preparation of these phosphites has been known for a long time and can be effected from phosphorus trichloride and alcohols.

As appropriate radical formers there may be used peroxides or other initiators which have in this temperature range a sufficiently high half-life-time of their disintegration, such for example as di-tert.-butylperoxide, tert.-butylperoxybenzoate, tert.-butylcumyl-peroxide, 2,5-dimethyl-hexane-bis-2,5-(peroxybenzoate), tert.-butylhydroperoxide, bis-2,2-(tert.-butylperoxy)-butane, tert.-butyl-peroxyethane-sulfonic acid-(n-butyl)-ester-(2), tert.-butylperoxyethane-nitrile-(2), acetylbenzoyl peroxide, dicumyl-peroxide or azobis-isobutanol-diacetate. These radical formers are added to the phosphites at the beginning in quantities of about 0.2 to about 2.0% by weight, referred to the dialkyl-(thio)-phosphite used. But it is also possible to add them dropwise, dissolved in a part of the corresponding phosphite, during the reaction. Thus their premature disintegration is avoided. The reaction can also be started by irradiation with UV-light. It may be of advantage to add in addition some radical formers.

Before the reaction starts, the oxygen which is in the reaction vessel is removed by means of an inert gas, preferably pure nitrogen. Then, the vinyl chloride is added as quickly as it is absorbed in form of gas, while briskly stirring, to the dialkyl phosphites heated to about 150°–about 200° C. After several hours the reaction is terminated. Because of their low boiling point the nonreacted starting substances which may be still present can easily be removed from the reaction products by distillation.

The reaction products are completely free of 1-chloroethane-phosphonic acid esters and represent largely pure 2-chloroethane-phosphonic acid esters. In order to prevent the possible formation of telomerisation products, the addition of vinyl chloride to dialkyl phosphites is suitably carried through only to a conversion of about 30 to about 50%. When using dialkyl-thiophosphites as starting compound the addition of vinyl chloride may amount to a conversion of about 100%. In this case no telomerisation could be detected. The reaction products can be recovered in pure form by fractional distillation, preferably in high vacuum.

The process of the present invention may also be effected in continuous way.

The 2-chloro-ethane-phosphonic acid esters prepared according to the process of the present invention represent intermediates for the manufacture of surface-active agents or wetting agents, textile softening agents, lubricants and oil additional agents, as they are necessary, for example, for the process according to German Pat. No. 1,211,200. The 2-chloro-ethane-phosphonic acid esters serve especially for the manufacture of vinyl-phosphonic acid esters which are used as valuable monomers, for example for the copolymerization with methacrylic acid esters, acrylonitrile, styrene or vinyl-acetate.

The following examples serve to illustrate the invention but they are not intended to limit it thereto.

EXAMPLE 1

After replacing the air by nitrogen, 60 g. of vinyl chloride are introduced at 160°–163° C. during 35 minutes, while briskly stirring, into a mixture consisting of 400 g. of diethyl phosphite and 10 g. of di-tert.-butyl peroxide. The diethyl phosphite in excess is then distilled off in water-jet vacuum. By distillation in high vacuum at a boiling point of 78° C. at 0.3 mm. of mercury, 190 g. of 2-chloroethane-phosphonic acid diethyl ester are obtained, which corresponds to a yield of 32.5% referred to the dialkyl phosphite introduced, and to a yield of 98.5%, referred to the vinyl chloride introduced.

EXAMPLE 2

After replacing the air by pure nitrogen, 104 g. of vinyl chloride are introduced in the course of 50 minutes at 185–188° C., while briskly stirring, into 1,000 g. of di-(2-ethylhexyl)-phosphite and a mixture of 8 g. of azoisobutanol diacetate and 30 g. of di-(2-ethylhexyl)-phosphite is simultaneously added dropwise. The di-(2-ethylhexyl)-phosphite in excess is then distilled off in high vacuum. 610 g. remain as residue (found: 9.8% Cl, 8.6% P; calculated: 9.65% Cl, 8.45% P). This corresponds to a yield of 50% of 2-chloroethane-phosphonic acid di-(2-ethylhexyl) ester, referred to the dialkyl phosphite introduced and to a yield of 100% referred to the vinyl chloride.

EXAMPLE 3

After replacing the air by nitrogen, 202 g. of vinyl chloride are introduced during 3 hours at 170°–172° C., while briskly stirring, into 950 g. of di-(2-ethylhexyl)-phosphite and a mixture of 50 g. of di-(2-ethylhexyl)-phosphite and 7 g. of di-tert.-butyl peroxide is simultaneously added dropwise. Thus 1,208 g. of crude 2-chloroethane-phosphonic acid di-(2-ethylhexyl)-ester are obtained.

EXAMPLE 4

After replacing the air by nitrogen, 242 g. of vinyl chloride are introduced during 2 hours at 163°–170° C., while briskly stirring, into a mixture of 860 g. of diethyl-thiophosphite and 9 g. of di-tert.-butyl peroxide. The di-ethyl thiophosphite in excess is then distilled off in the water jet vacuum. By distillation in high vacuum at a boiling point of 86° C. at 0.25 mm. of mercury, 830 g. of 2-chloroethane-thiophosphonic acid di-ethyl ester are obtained, corresponding to a yield of 68.5% referred to the dialkyl thiophosphite introduced and to a yield of 100% referred to the vinyl chloride used.

EXAMPLE 5

After replacing the air by nitrogen 150 g. of vinyl chloride are introduced during 90 minutes at 156°–162° C., while briskly stirring, into a mixture of 710 g. of di-isopropyl-thiophosphite and 6 g. of di-tert.-butyl peroxide. The excess di-isopropylthiophosphite is then distilled off in the water-jet vacuum. In the high vacuum at a boiling point of 78°–83° C. at 0.5 mm. of mercury, 585 g. of 2-chloroethane-thiophosphonic acid di-isopropyl ester are obtained, which corresponds to a yield of 61.5% referred to the dialkyl-thiophosphite introduced and to a yield of 100% referred to the vinyl chloride introduced.

EXAMPLE 6

After replacing the air by pure nitrogen, 140 g. of vinyl chloride are introduced, while briskly stirring during 60 minutes at 174°–180° C. into 1,100 g. of di-(2-ethylbutyl)-phosphite. A mixture of 30 g. of di-(2-ethylbutyl)-phosphite and 3 g. of di-tert.-butyl-peroxide is simultaneously added dropwise. The di-(2-ethylbutyl)-phosphite in excess is then distilled off in high vacuum. A residue of 680 g. remains (found: 11.5% Cl, 10.1% P; calculated: 11.35% Cl, 9.9% P) corresponding to a yield of 48% referred to the dialkyl phosphite and to a yield of 97% referred to the vinyl chloride introduced. By distillation of the residue the pure 2-chloroethane-phosphonic acid di-(2-ethylbutyl)-ester is obtained having a boiling point of 125° C. at 0.2 mm. of mercury.

EXAMPLE 7

After replacing the air by pure nitrogen, 82 g. of vinyl chloride are introduced while briskly stirring for 30 minutes at 198°–200° C. into 800 g. of di-(n-hexyl)-phosphite. Simultaneously, a mixture of 10 g. of di-(n-hexyl)-phosphite and 2 g. of di-tert.-butyl-peroxide is added dropwise. The di-(n-hexyl)-phosphite in excess is then distilled off in high vacuum. A residue of 370 g. remains (found: 11.6% Cl, 10.0% P; calculated: 11.35% Cl, 9.9% P) corresponding to a yield of 37% referred to the dialkyl phosphite used and to a yield of 90% referred to the vinyl chloride. By distillation of the residue the pure 2-chloro-ethane-phosphonic acid di-(n-hexyl)-ester of the boiling point of 135°–140° C. at 0.1 mm. of mercury is obtained.

We claim:

1. A process for preparing a compound of the formula

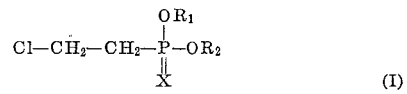

$$\text{Cl}-\text{CH}_2-\text{CH}_2-\overset{\overset{\displaystyle OR_1}{|}}{\underset{\underset{\displaystyle X}{\|}}{P}}-OR_2 \qquad (I)$$

wherein X represents oxygen or sulfur and $R_1$ and $R_2$ stand for alkyl having 1 to 12 carbon atoms, which comprises reacting vinyl chloride at about normal pressure with a dialkyl phosphite of the formula

$$\text{H}-\overset{\overset{\displaystyle OR_1}{|}}{\underset{\underset{\displaystyle X}{\|}}{P}}-OR_2 \qquad (II)$$

wherein X, $R_1$ and $R_2$ have the meanings defined above, in the presence of free radical initiator at a temperature between about 120° and 200° C., wherein the reaction is carried out up to a conversion of about 30 to 50% only if a dialkylphosphite of the formula (II) is used in which X stands for oxygen, and wherein the process carried out under inert atmosphere and in absence of oxygen dissolved in said reactants.

2. The process as claimed in claim 1, wherein the reaction is carried out at a temperature between 150° and 180° C.

3. The process as claimed in claim 1, wherein di-tert.-butyl-peroxide, tert.-butylperoxy-benzoate, tert.-butyl-cumylperoxide, 2,5-dimethyl-hexane-bis - 2,5 - (peroxy-benzoate), tert.-butylhydroperoxide, bis-2,2-(tert.-butyl-peroxy)-butane, tert.-butyl-peroxyethane-sulfonic acid-(n-butyl)-ester-(2), tert.-butylperoxyethane - nitrile-(2), acetylbenzoyl peroxide, dicumyl-peroxide or azobis-iso-butanol-diacetate, are used as free radical initiator.

References Cited

UNITED STATES PATENTS 2,612,513   9/1952   Gluesenkamp et al. _ 260—970X
3,029,272   4/1962   Runge _____ 260—970

CHARLES B. PARKER, Primary Examiner

R. L. RAYMOND, Assistant Examiner

U.S. Cl. X.R.

260—961